US012780710B2

(12) United States Patent
Wheeler et al.

(10) Patent No.: US 12,780,710 B2
(45) Date of Patent: Nov. 3, 2026

(54) METHOD FOR FABRICATING AN OPTICAL FIBRE PREFORM

(71) Applicant: University of Southampton, Southampton (GB)

(72) Inventors: Natalie Wheeler, Southampton (GB); Peter Shardlow, Southampton (GB); Francesco Poletti, Southampton (GB)

(73) Assignee: University of Southampton, Southampton (GB)

( * ) Notice: Subject to any disclaimer, the term of this patent is extended or adjusted under 35 U.S.C. 154(b) by 155 days.

(21) Appl. No.: 18/582,351

(22) Filed: Feb. 20, 2024

(65) Prior Publication Data

US 2024/0190754 A1 Jun. 13, 2024

Related U.S. Application Data

(63) Continuation of application No. 16/628,423, filed as application No. PCT/GB2018/051877 on Jul. 4, 2018, now Pat. No. 11,964,899.

(30) Foreign Application Priority Data

Jul. 5, 2017 (GB) ..................................... 1710813

(51) Int. Cl.

| | |
|---|---|
| ***C03B 37/012*** | (2006.01) |
| ***C03B 23/207*** | (2006.01) |
| ***G02B 6/02*** | (2006.01) |

(52) U.S. Cl.

CPC ........ *C03B 37/0122* (2013.01); *C03B 23/207* (2013.01); *C03B 37/01225* (2013.01);

(Continued)

(58) Field of Classification Search

CPC .. C03B 37/0122; C03B 37/012; C03B 23/207

See application file for complete search history.

(56) References Cited

U.S. PATENT DOCUMENTS

| | | | | |
|---|---|---|---|---|
| 2001/0028502 A1* | 10/2001 | Koyama | ................ C03B 23/02 | 359/566 |
| 2002/0056291 A1* | 5/2002 | Schultz | .................. C03B 23/20 | 65/412 |

(Continued)

FOREIGN PATENT DOCUMENTS

| | | | |
|---|---|---|---|
| WO | WO-2012077718 A1 * | 6/2012 | ............. C03C 27/06 |
| WO | WO-2017032454 A1 * | 3/2017 | ......... C03B 37/0122 |

OTHER PUBLICATIONS

Kosolapov A.F. et al, Hollow-core revolver fibre with a double-capillary reflective cladding, 2016, Quantum Electronics, 46 (3), 267-270 (Year: 2016).*

(Continued)

*Primary Examiner* — Erin Snelting
*Assistant Examiner* — Steven S Lee

(57) ABSTRACT

A method of making an optical fibre preform comprising providing a hollow outer tube of glass, providing a hollow primary capillary tube of glass with an outer diameter smaller than an inner diameter of the outer tube, positioning the primary capillary tube inside the outer tube such that an outer surface of the primary capillary tube lies against an inner surface of the outer tube along a contact line parallel to the longitudinal axes of the primary capillary tube and the outer tube, and bonding the primary capillary tube into its position inside the outer tube by directing a laser beam onto a surface of the outer tube or the primary capillary at one or more locations aligned with the contact line.

18 Claims, 6 Drawing Sheets

(52) U.S. Cl.
CPC ...... *G02B 6/02328* (2013.01); *C03B 2203/16* (2013.01); *C03B 2203/42* (2013.01)

(56) References Cited

U.S. PATENT DOCUMENTS

| | | | | |
|---|---|---|---|---|
| 2002/0096501 | A1* | 7/2002 | Schultz | C03B 23/20<br>219/121.64 |
| 2010/0304151 | A1* | 12/2010 | Tuennermann | C03C 23/0025<br>428/428 |
| 2013/0068384 | A1* | 3/2013 | Liu | B32B 37/06<br>219/121.61 |
| 2014/0199519 | A1* | 7/2014 | Schillinger | B23K 26/53<br>219/121.75 |

OTHER PUBLICATIONS

Zhang T. et al, Design and Fabrication of a Novel Core-Suspended Optic Giber for Distributed Gas Sensor, 2014, Photonic Sensors, vol. 4, No. 2, 97-101 (Year: 2014).*

* cited by examiner

METHOD FOR FABRICATING AN OPTICAL FIBRE PREFORM

CROSS-REFERENCE TO RELATED APPLICATIONS

This application is a continuation of U.S. patent application Ser. No. 16/628,423 filed Jan. 3, 2020, which is a U.S. National Stage of PCT/GB2018/051877 filed Jul. 4, 2018, which claims the benefit of United King Application No. 1710813.5 filed Jul. 5, 2017, and which applications are incorporated herein by reference. To the extent appropriate, a claim of priority is made to each of the above disclosed applications.

BACKGROUND OF THE INVENTION

The present invention relates to a method for fabricating a preform for making optical fibre, in particular for making hollow core optical fibre.

Glass-based optical fibres can be made from a preform, which is a tubular element comprising the required cross-sectional structure of the optical fibre, with desired core and cladding features, assembled on a much larger scale than the intended width of the optical fibre. The preform is then softened by heating in a furnace, and stretched or drawn into a greater length and smaller width, until the required diameter for the optical fibre is reached. This may be done in a drawing tower, in which the preform is suspended vertically with a weight hanging from its lower end for gravity-assisted stretching, or in which fibre is drawn under tension from the end of the preform. An intermediate product, known as a cane and which is only partly drawn to the required fibre dimensions, may also be made. Arranging large scale components into a preform is more practical than assembling components of the final intended size, particularly for fibres with a complex internal structure such as holey fibres, including hollow core fibres in which the central core comprises an air-filled void.

An example is antiresonant hollow core optical fibre, which comprises an outer jacket or hollow cladding tube of glass with an array of smaller diameter hollow glass tubes or capillaries arranged inside and bonded to the inner surface of the jacket tube at spaced apart intervals, with no contact between the smaller diameter tubes. Such fibre may be referred to as tubular non-contact hollow core fibre. A sub-category of this format of tubular fibre is nested anti-resonant nodeless fibre (NANF), in which one or more smaller diameter capillaries are nested in the spaced-apart small diameter tubes and bonded in place against the inner surface so that the contact point between the tubes of each nested set falls at the same azimuthal or circumferential position on the jacket tube. NANFs are of interest for providing ultralow loss, wide optical bandwidth and single mode optical guidance. However, these high performance properties rely on an accurate and rigorous geometry in which contact between the nested tubes is maintained straight and parallel to the longitudinal central axis of the jacket tube along the length of the fibre.

Some other types of hollow core fibre, such as Kagome or photonic bandgap fibre, comprise many closely packed small capillaries. Once stacked inside the cladding tube to create the preform, the capillaries maintain their position well during the drawing process to give a finished fibre with an accurate structure. In contrast, the spaced apart inner tubes of the antiresonant fibre types are free to move from their desired position within the preform unless secured in some way. Holding all the tubes in place only at the ends of the preform tends to be ineffective at producing regularly and accurately structured cane and fibre, since between the two ends the capillaries can move quite freely from their desired positions when the preform is in the furnace. Accordingly, other approaches for fabrication of non-contact fibres have been considered.

Typical fabrication procedures [1-6] can involve extensive manual handling by a skilled practitioner. Accordingly, such processes are prone to introducing contamination to the fibre materials, and cannot be readily scaled up to high volume manufacturing. For example, packing elements can be inserted into the jacket tube to hold the capillaries in the desired positions; the packing can be at the ends only or along the tube's length. This is a skilled user-intensive procedure. In one reported example of NANF manufacture [7], the nested components were prefabricated by drawing a pair of tubes (a smaller tube nested inside a larger one) which were then assembled inside a jacket tube. However, twisting unavoidably occurs during drawing of the nested pair, so that it is then impossible to stack the pair into the jacket tube with the proper, parallel orientation of the nested structure. If the contact point of an inner capillary is not in correct alignment with the contact point of the outer capillary, for example if it instead twists in a helical manner along the tube, the performance of the fibre is severely degraded. In another example [8] a small oxy-hydrogen flame was used to fuse together a nested pair of tubes held on a lathe, which were then drawn, and stacked to create a preform from which the final fibre was drawn. While a seemingly regular-looking cross-section for the fibre was achieved, there were some visible azimuthal asymmetries. Also, the technique appears to be limited to preforms formed from relatively thick tubes, giving a fibre with thick membranes and a consequent fundamental optical guidance window located far into the mid infra-red. The use of a flame to fuse the tubes delivers a lot of heat to the structure, causing distortions when thinner tubes are used. Hence the method is not applicable to make a nested element preform for fibre intended for low loss at shorter wavelengths, particularly near-infrared telecommunications wavelengths, which requires thin fibre membranes. Also, the technique is believed to be prone to twisting within the nested elements with respect to the outside of the preform. Consequently, the resulting fibres would suffer high loss compared to an ideal twist-free structure, or the method is limited to production of short lengths of uniform fibre only. Further, using a flame places strict limits on the types of packing material that may be used to hold the tubes in place, since they need to withstand temperatures in excess of 1600° C.

Accordingly, improved methods for fabricating preforms for non-contact hollow core optical fibres are of interest.

SUMMARY OF THE INVENTION

According to a first aspect of certain embodiments described herein, there is provided a method of making an optical fibre preform comprising: providing a hollow outer tube of glass; providing a hollow primary capillary tube of glass with an outer diameter smaller than an inner diameter of the outer tube; positioning the primary capillary tube inside the outer tube such that an outer surface of the primary capillary tube lies against an inner surface of the outer tube along a contact line parallel to the longitudinal axes of the primary capillary tube and the outer tube; and bonding the primary capillary tube into its position inside the outer tube by directing a laser beam onto a surface of the outer tube or the primary capillary at one or more locations aligned with the contact line.

According to a second aspect of certain embodiments described herein, there is provided a method of fabricating a hollow core optical fibre or a cane for a hollow core optical fibre, comprising: fabricating an optical fibre preform according to the method of the first aspect; and drawing the preform under the application of heat to a required diameter for the optical fibre or the cane.

According to a third aspect of certain embodiments described herein, there is provided an optical fibre preform fabricated according to the method of the first aspect.

According to a fourth aspect of the certain embodiments described herein, there is provided a preform for an optical fibre, comprising a hollow outer tube of glass, and a plurality of hollow primary capillary tubes of glass with an outer diameter smaller than an inner diameter of the outer tube, each primary capillary tube bonded to the inner surface of the outer tube by one or more laser welds along a contact line parallel to the longitudinal axes of the outer tube and the primary capillary tubes such that the primary capillary tubes are spaced apart from one another around the circumference of the outer tube.

According to a fifth aspect of certain embodiments described herein, there is provided a preform for an optical fibre according to the fourth aspect, further comprising a plurality of hollow secondary capillary tubes of glass with an outer diameter smaller than an inner diameter of the primary capillary tubes, each secondary capillary tube bonded by one or more laser welds to the inner surface of a primary capillary tube.

According to a sixth aspect of certain embodiments described herein, there is provided a hollow core optical fibre or a cane for a hollow core optical fibre fabricated by drawing a preform according to fourth or fifth aspect.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a method for fabricating an optical fibre preform, or a preform or optical fibre using such a method, may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Figure 1:
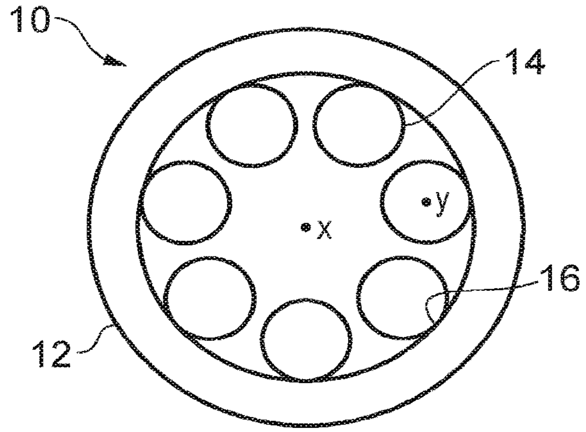
FIG. 1 shows a schematic transverse cross-sectional view of a first example non-contact hollow core optical fibre, to which embodiments of the disclosure are applicable.

FIG. 1 shows a cross-sectional view of an example tubular non-contact hollow core optical fibre (a type of antiresonant hollow core optical fibre). The fibre 10 comprises a hollow cylindrical outer tube or jacket 12 formed from glass, being the cladding layer of the fibre 10. The core of the fibre 10 comprises seven inner cylindrical tubes or capillaries 14, also formed from glass. Each capillary 14 has a smaller external diameter than the outer jacket 12, and also has a thinner wall thickness, being the thickness of glass material forming the tube. Each capillary 14 is bonded or secured on its outer surface to the inner surface of the outer tube 12, such that the capillaries 14 are regular spaced around the inner circumference of the outer tube 12. Each capillary 14 therefore touches, lies against or contacts the inner surface of the outer tube 12 at a contact point 16 in the cross-section of the fibre 10. The contact points 16 are regularly spaced around the inner circumference of the outer tube 10, such that each occupies a different angular, circumferential or azimuthal position with respect to the central longitudinal axis of the outer tube 12, marked as X. For optimum low loss optical propagation in the fibre 10, it is beneficial that the cross-sectional structure is maintained constant along the longitudinal extent of the fibre 10, namely along the longitudinal axis X. In other words, there is no twisting or displacement of the tubes (capillaries) relative to one another along the fibre length, so that the central longitudinal axes Y of each capillary 14 remain parallel to the longitudinal axis X of the outer tube 12. Similarly, the projection of each contact point 16 along the length of the fibre 10 also remains parallel to the various longitudinal axes X, Y. This projection of a contact point 16 along the fibre can be thought of as a contact line, representing the contact of a capillary 14 against the inner surface of the outer tube 12.

Note that the capillaries 14 are spaced around the circumference of the outer tube such that there is no contact between adjacent capillaries, this being a feature of a tubular non-contact hollow core optical fibre. Similarly, the central region of the fibre core, around which the capillaries are spaced, is an empty air-filled void, providing the hollow core. The diameter of the capillaries can be selected to maintain the non-contact arrangement and with a view to providing a central void of a desired width.

Figure 2:
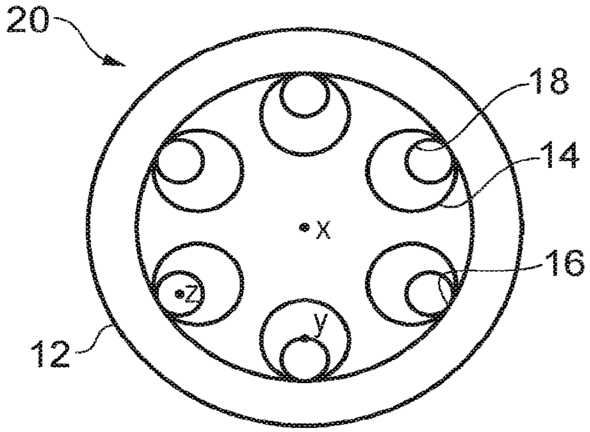
FIG. 2 shows a schematic transverse cross-sectional view of a second example non-contact hollow core optical fibre, to which embodiments of the disclosure are applicable.

FIG. 2 shows a cross-sectional view of an example of a further type of antiresonant hollow core optical fibre, namely a nested antiresonant nodeless fibre (NANF) 20. In common with the FIG. 1 example, the fibre 20 comprises an outer jacket layer 12 and a plurality (in this example, six) of capillary tubes 14 bonded to the inner surface of the outer jacket 12 at regularly spaced intervals such that there is no contact between adjacent capillaries 14. In addition, the NANF 20 comprises extra smaller capillaries 18 nested inside the main capillaries 14. Accordingly, the main capillaries 14 can be designated as primary capillaries and the smaller capillaries can be designated as secondary capillaries 18. The secondary capillaries 18 have an outer diameter smaller than the inner diameter of the primary capillaries 14, and may also have a thinner wall thickness (in other examples this wall thickness may be greater than or equal to the wall thickness of the primary capillary). As before, each primary capillary 14 has a contact point 16 at which it lies against the inner wall of the outer jacket 12. Further, one secondary capillary 18 is arranged inside each primary capillary 14 and lies against the inner surface of that primary capillary at a point in radial alignment with the contact point 16 for that primary capillary. Thus, each pair of primary and secondary capillaries has a shared or common contact point at the same angular or azimuthal position, extended or projected as a common contact line along the fibre length. This arrangement means that the longitudinal axes Z of the secondary capillaries 18 are parallel to the longitudinal axes X and Y of the outer tube 12 and the primary capillaries 14 and also to the contact lines. Each secondary capillary 18 can be described as being nested inside a primary capillary 14, and each nested pair of capillaries (formed from a smaller, secondary, capillary inside a larger, primary, capillary) is bonded to the outer tube 12 at a different contact point/line.

Figure 3:
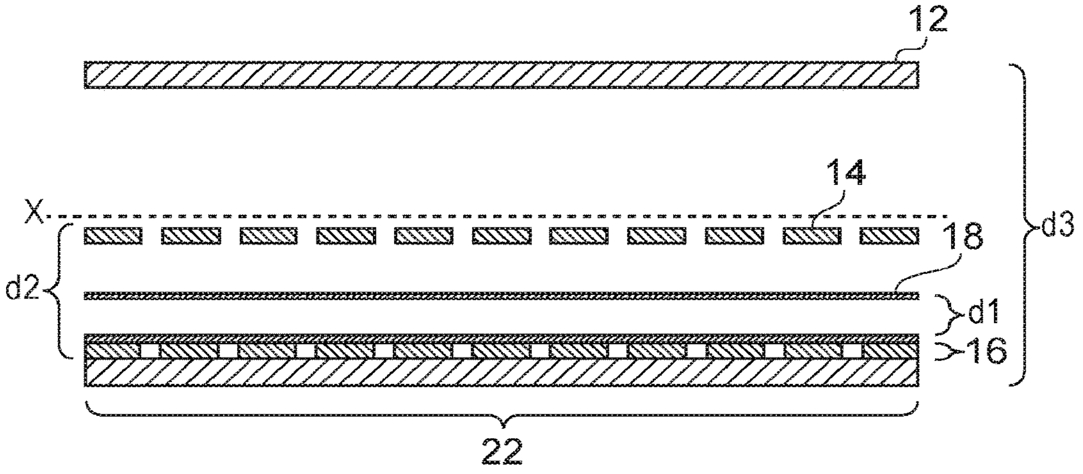
FIG. 3 shows a schematic longitudinal cross-sectional view of the example optical fibre of FIG. 2.

FIG. 3 shows a longitudinal cross-section (not to scale) through an example hollow core fibre or preform therefor in which a single nested pair of capillaries is shown for clarity. An innermost, secondary capillary 18 of diameter d1 sits inside a primary capillary 14 of diameter d2, which in turn sits inside an outer tube 12 of diameter d3. The secondary capillary 18 rests with its outer surface against the inner surface of the primary capillary 14. In turn, the outer surface of the primary capillary 14 at the same radial position as the contact with the secondary capillary 18 on the inner surface lies against the inner surface of the outer tube 12. Hence, there is a shared contact point 16 at a single azimuthal position on the outer tube 12. The contact point, when projected along the length of the fibre/preform, defines contact line 22 parallel to the longitudinal axis X of the fibre/preform. The walls of the primary capillary d2 are indicated with dotted lines for clarity, so that the configuration of the tube and capillaries resting one against the other along the contact line can be appreciated.

Optical fibre of a complex cross-sectional structure such as these examples can conveniently be fabricated from an optical fibre preform which comprises components giving the same cross-sectional structure but on a much larger scale. Consequently, the drawings of FIGS. 1 and 2 equally represent cross-sectional views through a preform suitable for forming into an optical fibre with the same cross-sectional structure, where both the preform and the fibre can be deemed to comprise an outer jacket tube with one or two sizes of capillary tube inside. Note that the structures of the FIGS. 1 and 2 fibres are examples only; more or fewer primary or secondary capillaries tubes can be included as desired. Also, the various tubes and capillaries need not be cylindrical; other tubular shapes such a tube with a hexagonal cross-section might be used. Heating and stretching of the preform using a furnace inside a drawing tower is used to pull optical fibre from the preform; pulling in the longitudinal direction (along the X axis) causes a corresponding reduction in diameter until the required width of fibre is achieved.

Accordingly, it is desirable for the structural geometry of the preform to be as accurate as possible, to increase the chance that the geometry of the final fibre is of a high enough standard. To achieve this, it is beneficial for the components of the preform to be securely held in their relative positions to reduce the risk that relative movement will occur during drawing of the fibre. This is particularly significant for antiresonant fibres with non-contact geometries, where the spaced-apart locations of the capillaries gives ample free space for movement of unsecured components during fibre drawing. While the heat applied in the drawing tower will cause softening or melting of the glass tubes which bonds the capillaries in place for the finished fibre, the absence of any bonding in the initial preform can cause the capillaries to bond into incorrect positions, which does not preserve the desired parallel relationship of the various longitudinal axes, and spoils the geometry of the fibre. Performance of the fibre is thereby compromised.

Therefore, it is proposed in the present disclosure to provide some bonding of the capillaries into their required positions in the preform, so that the fibre geometry can be better preserved during drawing and into the finished fibre. By "bonding", it is meant that at least some regions of glass in the contact lines are softened or melted so that adjacent tubes and capillaries become fused or melded together. In accordance with various examples the bonding may be provided continuously along the length of the preform, or at selected spaced locations along the preform length, so as to "tack" the capillaries in place. The bonding is provided along the contact line where the glass has been fused. One or both of two contacting, touching or near-touching surfaces along the contact line is softened or melted to achieve the bond.

Note that the term "contact line" does not necessarily imply physical contact between two surfaces along the entire length of the line, since minor bends or imperfections in the tubes and capillaries can give surfaces which are locally non-flat and therefore not able to be in contact. Generally, though, contact between two surfaces is intended along the length of the contact line, and is achieved as much as possible within the physical deficiencies of the components used. In a real preform or a real fibre, no matter how carefully fabricated, there will likely be at least minimal distortion away from the ideal arrangement of parallel longitudinal axes and contact lines described above, possibly due to bends, curvature or similar distortions in the various jacket and capillary tubes. Accordingly, reference herein to tubes and capillaries being "in contact" does not necessarily imply that contact is made at every point along the length of the respective components. The components may touch only at some locations along a contact line, within the tolerance of the available components. The term "contact line" indicates a linear region of finite but relatively narrow width along which contact would be continuous in an ideal situation with perfect straight tubes and capillaries.

According to the present proposal, the bonding of the capillary tubes within the outer jacket of the preform is achieved by application of a laser beam, which may for example be focused or collimated, to the outer surface of the jacket or the inner surface of a capillary, in some examples with the focal point of the beam on or near the surface (discussed further below). The energy delivered by the laser beam, combined in some cases with the small spatial extent of a focused beam, provides localised heating that can be targeted precisely where needed (namely, on the contact line) to soften or melt the glass so that contiguous structures are fused together. Larger scale distortion that can be caused by more extensive heating, such as with a flame or in a drawing tower furnace, can be reduced or avoided, so the geometry of the preform can be highly accurate, and with careful drawing this can be preserved into the finished fibre. High levels of fibre performance can thus be achieved also. Since one or both of two contacting, touching or near-touching surfaces is softened or melted to achieve the bond, the fusing process can be considered as a laser welding process. As will be appreciated from the following description, laser bonding or welding reduces the need for extensive user input and in particular manual handling as compared to previously proposed fabrication techniques. Contamination is thereby reduced, and fabrication can be faster, more efficient, and more automated. Also, the localised targeted heating from the laser beam makes the method applicable to glass tubes of arbitrarily small wall thickness, so the method is more widely applicable than techniques using flame heating. The method can also be readily scaled to fabricate long length preforms of uniform geometry, giving a larger fibre yield.

Figure 4A:
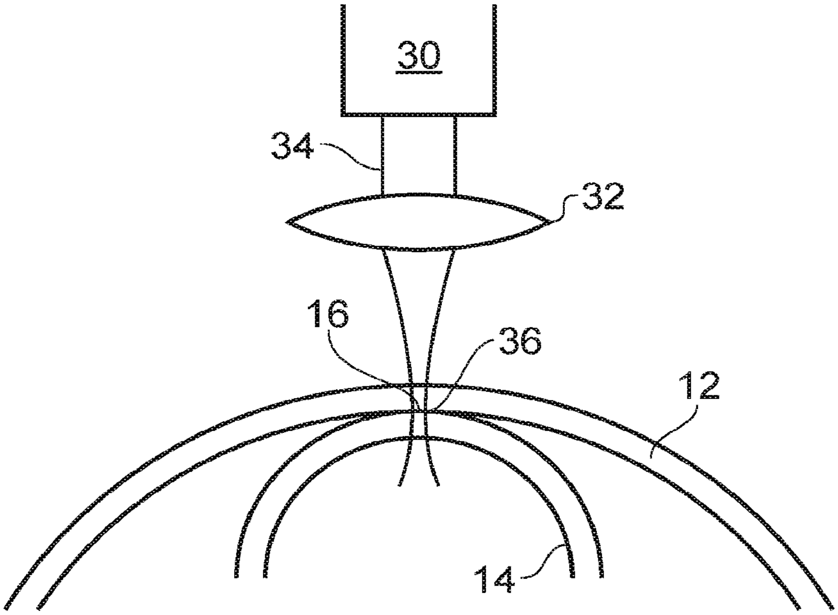
FIG. 4A shows a simplified schematic transverse view of apparatus for a fabrication method in accordance with embodiments of the disclosure.

FIG. 4A shows a simplified schematic transverse cross-sectional view of a laser welding arrangement in accordance with an example. A capillary tube 14 (only part of which is shown) is arranged inside an outer tube 12 (also shown in part only), touching at a contact point 16. An optical source 30 operable to generate a laser beam 34 is positioned externally to the outer tube 12 so that the beam 34 is directed towards the outer tube 12 in alignment with the contact point 16. A focusing system 32, depicted as a single converging lens, but which may comprise multiple optical elements to achieve a desired focus, is arranged in the laser beam 34 to focus the output of the optical source 30 to a focal point 36, or beam waist, where the laser beam is brought to a narrowest width. In this example, the focal point is positioned to coincide with the contact point 16. However, this is not essential, and the focus may be located at the outer surface of the outer tube 12, before the beam reaches the outer surface, inside the thickness of wall of either the outer tube 12 or the capillary 14, or inside the capillary's inner surface. The position can be chosen having regard to the absorption depth of the wavelength of the laser light in the glass or glasses from which the outer tube and the capillary are formed, the refractive index of the glass material(s), the thickness of the walls of the outer tube and the capillary, and the width of the focal point, with the aim of delivering sufficient heat energy to produce softening or melting at the contact point adequate to create the bond between the adjacent surfaces. In some configurations, the beam width and power may be appropriate to provide enough energy without the need for focusing, and a collimated or diverging beam can be used. In an example, the width of the beam at the contact point may be less than the inner diameter or the outer diameter of the narrowest capillary tube being bonded. In the event that the laser energy and its heating effect extends much beyond the contact point (depending on the absorption of the energy by the glass material), this can avoid excessive exposure of the small capillary to the laser energy, reducing softening that might cause distortion. Also, the depth of focus can be considered. A very tight focus, with a short beam waist, can deliver high power and hence high temperature over a small thickness of glass to give more targeted bonding. However, in an example where multiple tubes are stacked at the contact line (multiple nested elements), the bond should reach through the walls of the various tubes, so a broader focus with a longer beam waist might be appropriate; this can allow the fusing of all tubes in the nest with a single welding step.

Figure 4B:
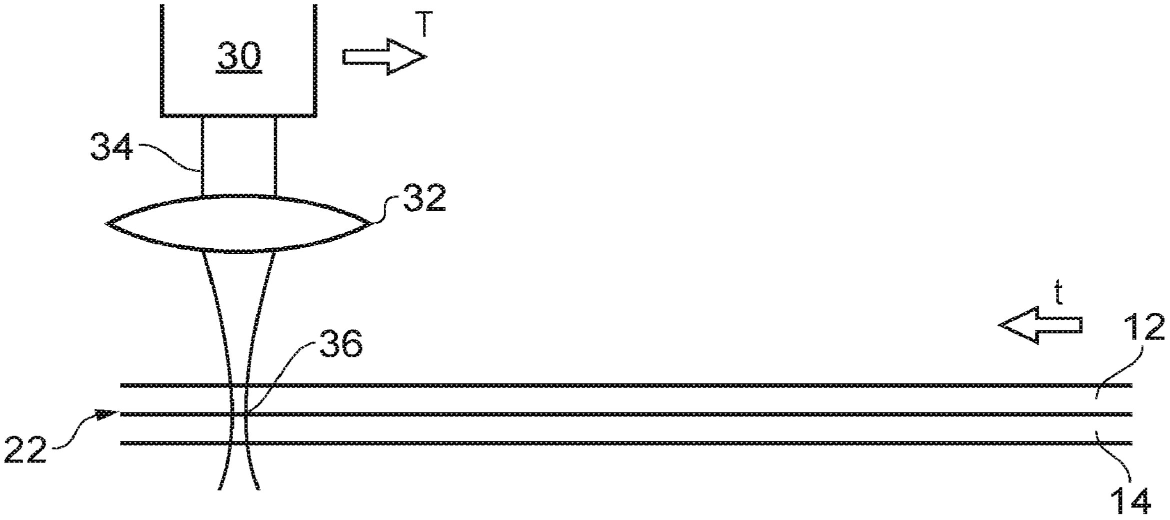
FIG. 4B shows a simplified schematic longitudinal view of the apparatus of FIG. 4A.

FIG. 4B shows a simplified schematic longitudinal cross-sectional view of the laser welding arrangement on the FIG. 3A example. The focus 36 of the beam 34 is positioned at the contact point. Recall that the contact point projects along the length of the preform components to define a contact line 22. Accordingly, to achieve a robust bond between the outer tube 12 and the capillary 14, translation between the laser beam and the preform is carried out to move the beam focus along the length of the contact line. This can be achieved by moving the laser source 30 in the translation direction T while holding the preform still, or by moving the preform in the translation direction t, opposite to the first direction T while keeping the laser source still, or by a combination of the two movements. Alternatively, a movable focusing system (including a translatable mirror, for example) could be employed to direct the beam onto the preform and move the focused part of the beam along the preform while the laser source 30 and/or the preform stay still. In all cases, the aim is to create relative movement between the laser beam and the preform so as to expose the extent of the contact line along the length of the preform to the energy of the laser beam to form a weld. The movement may be continuous with constant emission of the laser beam, to form a continuous weld along the contact line. Alternatively, the laser beam may be operated intermittently along the contact line to produce a series of point welds. This intermittent exposure to the laser beam may be performed during constant relative movement, or the components may be repositioned from one weld point to the next, and held still while the laser exposure is provided.

Figure 5:
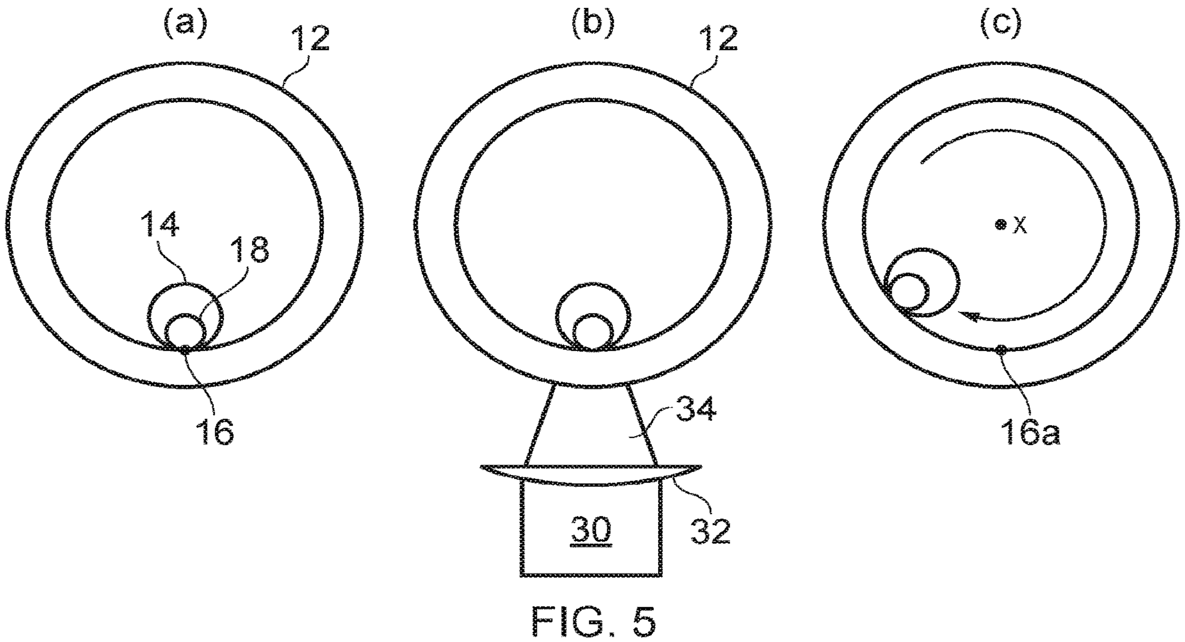
FIGS. 5(*a*), 5(*b*) and 5(*c*) show simplified transverse views of three stages in a preform fabrication method according to an embodiment.

FIG. 5 shows simplified schematic transverse views of steps in an example welding process. In FIG. 5(*a*), a nested pair of capillary tubes, comprising a secondary capillary 18 within a primary capillary 14 are positioned inside an outer tube 12, aligned at a common contact point 16. The contact point 16 has an azimuthal position which is the angular displacement of the contact point from an arbitrary reference point on the circumference of the outer tube 12.

FIG. 5(*b*) shows the laser weld being fabricated at the contact point 16, and along the contact line as discussed above with reference to FIG. 4B, by application of a laser beam 34 from an optical source 30 and focused by a focusing system 32. Note that in this example, the laser beam 34 is directed towards the outer tube 12 from below (the beam direction is up), whereas the FIGS. 4A and 4B example show the laser beam directed onto the outer tube 14 from above (the beam direction is down). The method is not limited in this respect, and the beam direction can be chosen according to convenience. This may be dictated at least in part by the technique selected to hold the tube and capillaries in place during the welding; various techniques are discussed further below. Some of these techniques necessarily require the outer tube to be held in a horizontal orientation, but in general the outer tube may be supported in any convenient position and the laser beam directed accordingly as is most convenient, subject to any positional restrictions imposed by the technique for positioning and holding the capillaries within the outer tube.

FIG. 5(*c*) shows the partially completed preform, comprised of the first and second capillaries 14, 18 welded to the outer tube 12, rotated about its longitudinal axis X away from its position during the first welding procedure of FIG. 5(*b*). The bonding of the capillaries by the laser weld allows the first nested capillary pair to rotate with the outer tube, and a new part of the outer tube is brought into alignment with the lowest position, where the laser beam can impinge to create a weld. Hence, a second contact point 16*a* at a second azimuthal position is positioned for welding, and a second nested capillary pair can be placed inside the outer tube 12 at the second contact point 16*a*, by repeating the FIG. 5(*a*) step, for a next welding step by repeating the FIG. 5(*b*) step. The azimuthal positions of the first contact point 16 and the second contact point 16*a* are separated sufficiently that a second nested capillary pair will not touch the first capillary pair. The rotating, positioning and welding steps can be repeated until all required capillaries are bonded with the outer tube.

Note that the capillaries may be positioned and bonded in any order; fabrication need not follow capillaries in sequence around the circumference of the outer tube. Also, the rotational repositioning between welds may be effected by movement of the laser beam (by moving the optical source 30 and/or the focusing system 32) to a new angular position around the outer tube, either alone or in combination with rotation of the tube.

Further, more than one capillary or capillary pair may be bonded concurrently if more than one laser beam is available for direction onto different parts of the outer tube. Multiple optical sources might be used, or a complex focusing system that includes beam splitters and directing optics might be used to divide a beam from a single optical source into multiple welding beams for direction onto the tube in different places. Indeed, if compatible with the technique used to hold the capillaries in place during a weld, one might use multiple beams to simultaneously weld all the contact points/lines at once. In this case, the rotational positioning indicated in FIG. 5(*c*) may be dispensed with, and only the longitudinal translation of FIG. 4B need be used.

Figure 6:
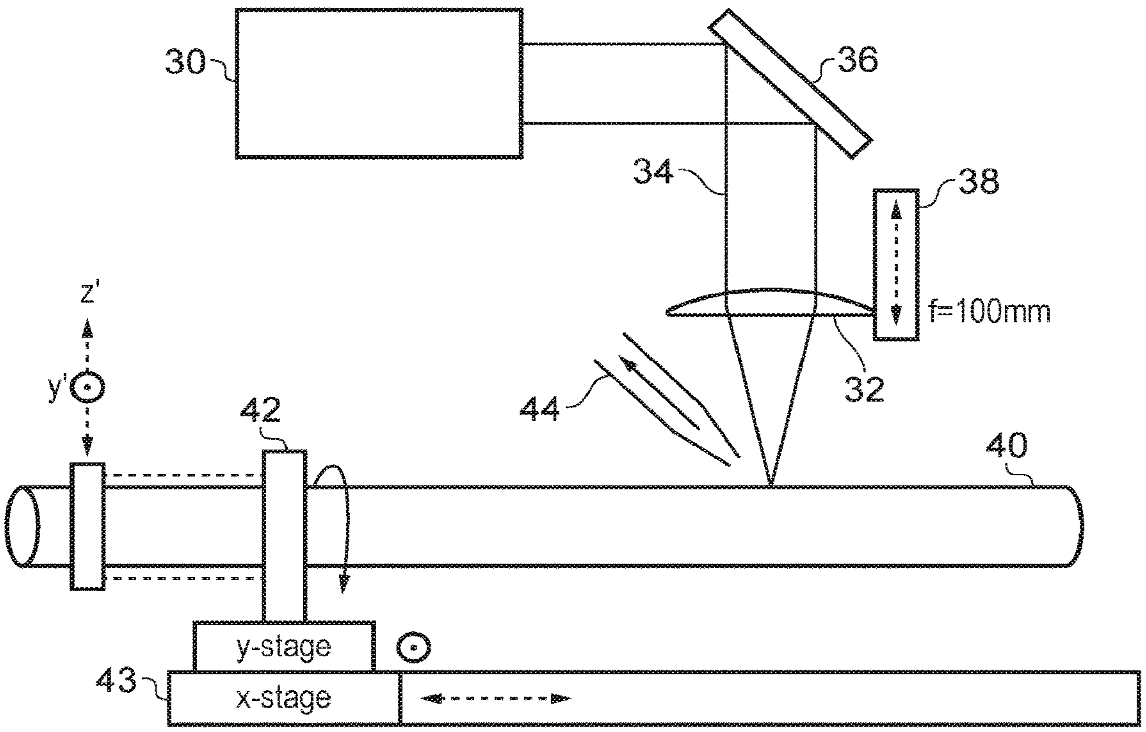
FIG. 6 shows a schematic representation of example apparatus for carrying out a preform fabrication method according to an embodiment.

FIG. 6 shows a schematic representation of an example apparatus for carrying out methods as disclosed herein. An outer tube for a preform 40 is mounted into a rotation stage 42 configured to rotate the tube about its longitudinal axis. Nested capillaries (not shown) are inserted into the tube. The outer tube and the capillaries are formed from silica. A laser source 30 comprising a carbon dioxide ($CO_2$) laser, operable to generate an output at a wavelength of 10.6 μm, is provided. Its output beam 34 is directed onto the outer tube using a mirror 36 (or similar directing optics), and a focusing lens 32 mounted on a stage 38 for movement of the lens along the beam axis, so the position of the focal point can be adjusted. The lens is planoconvex, has a 100 mm focal length and is formed from ZnSe. The focused beam is incident onto the outer tube in alignment with the contact point of the nested capillaries against the inner surface of the outer tube. The laser output is linearly polarised with a quality factor $M^2<1.5$, and able to be switched at up to 100 kHz with peak effective power of 250 W and with pulse lengths from 10-500 μs. A continuous wave laser may alternatively be used. The 10.6 μm laser light has an absorption depth of around 35 μm in silica; this depth reduces as the temperature increases [9]. This absorption depth is relatively short, so energy delivered by the laser beam does not spread very far in the silica. Hence, the incident laser beam raises the temperature of the outer tube in a localised targeted region only to cause softening of the glass; by arranging this region to be at a depth where the contact point between the outer tube and the capillaries is situated, the nested elements bond onto the outer tube. The temperature of the bonding process can be controlled by the average power from the laser, and size of the focused laser spot. Control of the average power of the pulsed $CO_2$ laser is via the product of pulse length and pulse repetition rate of the laser, with the laser producing top hat-type pulses with a peak power of about 250 W. It is desirable to avoid raising the peak temperature of the glass to above the ablation threshold, so operation at high repetition rates (60 kHz or above), and with short pulse lengths (5 to 20 μs) may be utilised. This minimises the ablation of material from the tube surface, whilst maximising the average power absorbed by the preform material. Laser spot size control via positioning of the focusing lens distance from the preform surface can be utilised to manage the width of the welded seam (or spot weld). For example, using a beam between 0.5 mm and 1.5 mm in diameter allows alignment tolerances of the contact point to ensure a secure weld, and promotes a more uniform heating through to the inner nested capillaries. Other spot sizes are not precluded, however. Spot size selection can be made with reference to the size of the preform components, to achieve an appropriate weld size.

The rotation stage 42 is mounted on a translation stage 43 for relative movement of the preform 40 and the laser beam 34 along the longitudinal extent of the contact line (in the x-direction). The stage 43 may also provide movement in the y-direction, transverse to the longitudinal extent of the preform, for fine adjustment of the alignment with the beam, so that it is directed onto the apex of the outer tube. The tube and capillaries may be point tacked together by laser exposure at only some points along the contact line, or the preform 40 can be transitioned along its longitudinal direction during constant exposure from the laser beam in order to seam weld the capillaries to the outer tube. For seam welding, the preform may be transitioned along its length at a rate of between 0.1 and 1.0 mm/s for example, although other velocities will be appropriate for different laser parameters. For an effective bond of multiple nested capillaries and tubes, multiple passes of the laser along the preform tube may ensure an improved bond. Once the weld has been completed, the preform 40 is rotated using the rotation stage 42 (which is also adjustable transverse to the x-axis for fine positioning), and the next set of nested capillaries is inserted and the process repeated until all nested capillaries required are bonded.

An extract 44 is included adjacent to the laser incidence spot to remove any ablated silica from the workpiece, to avoid interaction of this material with subsequent laser pulses, and deposition onto the preform 40 and the focusing optics 32.

The apparatus may be modified to include a second beam delivery line from the same laser, for example to apply the laser beam from below the preform, to the lowest point of the preform. Additional beam lines at other angular locations may also be included.

It is possible by this technique to bond together both various thicknesses of outer tube and primary and secondary (or further) nested capillaries, and nested capillaries alone which may then be utilised in a more conventional stacking arrangement to make holey optical fibre. The term "outer tube" does not imply any function of this component as the outermost layer in a finished optical fibre.

For the production of low loss optical fibre, it is important to achieve correct alignment of the nested capillaries relative to each other and to the outer tube. Correct alignment in the fibre can be aided by accurate alignment within the originating preform. In previous production of NANF, packing elements have been inserted into the jacket tube of the preform to align the elements into required positions. Not only is this a skilled user-intensive process, the use of a flame-based heating element to bond the tubes limits the choice of packing materials to those which can survive heating to more than 1600° C. By contrast, the use of laser welding according to the present disclosure enables a wider range of materials as packing elements, since the temperature of the preform material is raised only in specifically targeted localised regions.

Moreover, alignment of the preform components can be achieved without packing materials or other positioning or locating elements. Some alignment techniques are proposed that make use of gravity.

Figure 7:
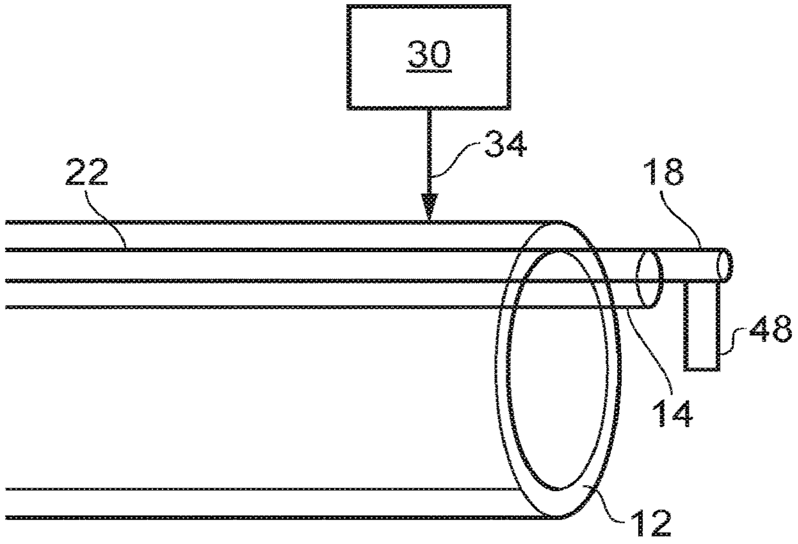
FIG. 7 shows a side view of components assembled for fabrication of a preform according to an embodiment.

FIG. 7 shows a schematic side view of a first example alignment technique, which is gravity-assisted. This example can be considered as a "nested element supported" or "nested capillary supported" technique. A secondary capillary tube 18 is placed inside a primary capillary tube 14 which is in turn placed inside an outer tube 12. The secondary, innermost, capillary tube protrudes from the other components, and is supported at this protruding end, in this example by a stand 48 or other support on which the tube is supported from below. For example, a support element might comprise a groove into which the end of capillary tube is laid. A corresponding support element is provided at the other end of the secondary capillary (not shown). Alternatively, the secondary capillary might be supported from above, such as by a sling or other suspended support into which the capillary end is inserted. The primary capillary 14 and the outer tube 12 hang from the secondary capillary 18, and the action of gravity aligns the three tubes along a single azimuthal contact line 22 along the apex of the preform components. Hence, a laser beam 34 from an optical source 30 is directed onto the outer tube 12 from above to create the weld along the contact line 22. This configuration can produce a particularly accurate alignment, because the rotational alignment torque due to the weight of the outer tube can overcome static forces. However, limitations on the strength of the secondary capillary, and its bowing limit, may restrict the maximum length of preform that can be effectively welded.

Figure 8:
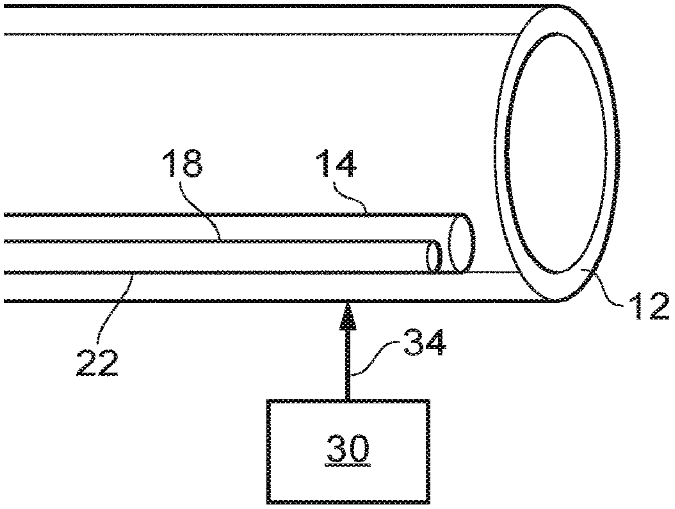
FIG. 8 shows a side view of components assembled for fabrication of a preform according to another embodiment.

FIG. 8 shows a schematic side view of a second example alignment technique utilising gravitational force. In this example, the secondary 18 and primary 14 capillaries are arranged inside the outer tube 12 as before, but in this case the outer tube is supported, rather than the innermost capillary tube. For example, the outer tube may be mounted on a rotational stage as in the FIG. 6 example. The nested capillaries 14, 18 are free to move inside the outer tube 12, so under the force of gravity they settle at the lowest point, along a single azimuthal contact line 22 along the lowest part of the outer tube 12. Accordingly, the laser beam 34 from an optical source 30 is incident onto the outer tube 12 from below. This configuration is convenient because the partially formed preform can be accurately rotated to successive angular positions without unmounting from the rotational stage. Preparation for a series of welds can therefore be achieved quickly, and the spacing of the respective azimuthal contact points can be accurately controlled. However, static effects and a possible relatively low weight of the capillary tubes may overcome gravity so that misalignment of the tubes may occur if they are left to settle unaided.

Figure 9:
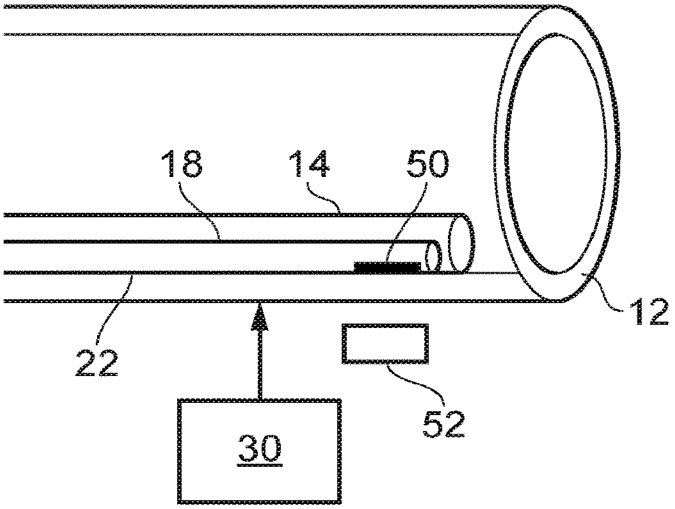
FIG. 9 shows a side view of components assembled for fabrication of a preform according to a further embodiment.

FIG. 9 shows a schematic side view of a third example alignment technique. The outer tube 12 and capillaries 14, 18 are arranged as in the FIG. 8 example, but magnetic forces are introduced to assist the gravity alignment and overcome any static effects. To achieve this, an iron bar 50 is placed inside the end of the secondary, innermost, capillary 18. An external magnet 52 is mounted below the preform, for example as a component of any rotational stage used to support the outer tube 12. The attraction between the iron bar 50 and the magnet 52 counteracts any static limiting the capillaries 14, 18 from reaching the bottom of the outer tube 12. The magnetic force is equivalent to a greater weight for the internally nested tubes, and hence can improve the alignment tolerance. The iron bar and magnet may be reversed in position, so that the magnet is placed inside the inner capillary. Alternatively, any pair of elements embodying opposite magnet poles (i.e. magnetically attracted elements) can be employed. Similarly, electrostatic forces may be used to provide alignment.

While the examples of FIGS. 7, 8 and 9 have each included an outer tube and a pair of nested capillaries, the alignment techniques can be applied to the welding of a single capillary into an outer tube, or to welding nested sets of more than two capillaries within an outer tube.

Furthermore, magnet alignment may be used to align capillaries in positions other than the lowermost part of the outer tube, if the magnetic pole pair has sufficiently strong attraction to overcome gravity and hence hold one or more capillary tubes in an elevated position inside the outer tube. This may be extended to simultaneously secure more than one capillary nest, where more than one laser beam is available.

Also, alignment techniques and techniques for securing the tube positions for the welding process which differ from these examples may alternatively be used as preferred or convenient As an example, a preform was fabricated by gravity-assisted alignment and $CO_2$ laser welding of capillary elements within an outer tube. The outer tube with a drawing handle for later fibre drawing was mounted within an apparatus similar to the FIG. 6 example. A single set of double nested capillary elements (primary capillary of 3.3 mm outer diameter and secondary capillary of 2.8 mm outer diameter, and 200 μm wall thickness) was inserted into the outer tube. Then a seam weld was formed, at a translation speed of 0.1 mm/s with the laser operating with 14 μs pulses at 18 kHz (equivalent to about 60 W average power), and a laser spot size of about 500 μm. Note that the translation speed can be selected with reference to the amount of power delivery required, having regard to the laser output, absorption depth and glass thickness. Once the first capillary set was bonded, the preform tube was automatically rotated by 60 degrees, and the next set of nested capillaries inserted, aligned by gravity, and welded, and so on to weld six capillary nests altogether. The total welded length (limited by the available translation stage) was 220 mm, with a total fabrication time of just over 3 hours including less than 20 minutes of skilled user time for preparing and inserting the nested capillaries. During the remaining time, automatic operation of the laser and the translation stage allows the welding process to be automated. As an initial demonstration, the area ratio of the primary and secondary capillaries was very similar so that alignment of the secondary capillary was insufficiently accurate for a correct contact line along the weld length. Subsequent use of a smaller secondary capillary combined with multiple passes of the laser at a higher speed produced a more effective bond.

Figure 10:
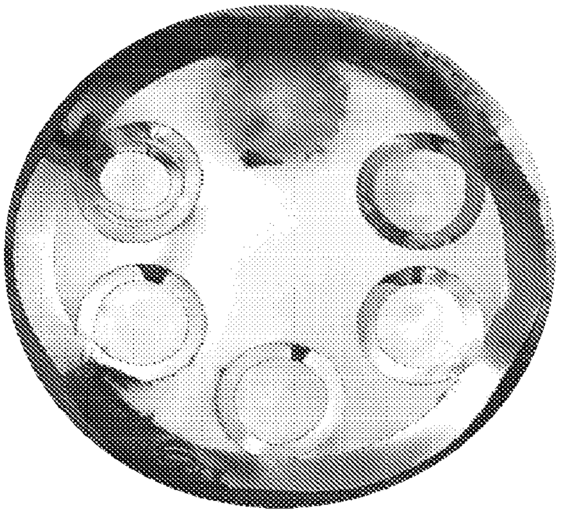
FIG. 10 shows a photographic image of a cross-section of a preform formed according to an embodiment.

FIG. 10 shows a photographic image of a cross-section through an intermediary cane pulled from a preform for a NANF fabricated according to the present disclosure. Bonding of single (primary) capillaries, and their accurate azimuthal alignment can be seen. Additionally, the insert and bonding of one secondary nested capillary is shown (at the "10 o'clock" position), although the area ratio of the two nested capillaries was too close to avoid additional deformation.

An advantage of preform fabrication as disclosed herein is that manual handling of the preform can be reduced or minimised. Once the preform components are positioned in place, the laser and any translation/rotation stages can be remotely controlled and programmed, thus potentially removing the need for a skilled practitioner to be present at all times. For example, as noted above, example preforms have been made with a practitioner presence needed for less than 20 minutes of a three hour fabrication duration. With appropriate equipment in a production facility, the method could enable any preforms to be assembled simultaneously under the supervision of a single person, and offers the capability for a more automated fabrication procedure compared with existing methods. Further, the procedure can bond several nested tubes simultaneously with the same pass of a laser, providing a time-efficient way to fuse nested components without causing undesirable distortions that can occur with other approaches that handle successive tubes separately.

The examples discussed thus far have deployed the laser beam externally to the preform, so that it is incident on the exterior, outer, surface of the outer glass tube. The laser beam, and/or the heat energy it generates, passes through the wall of the primary tube to reach the contact point and induce the required softening or melting of the glass material. However, the method is not limited in this regard, and the bonding can alternatively be effected by internal deployment of the laser beam, so that it is incident on the relevant part of the preform through one or both sides of a capillary tube. While it may be possible to arrange a compact laser source physically inside a preform to direct the beam in this way, it may be more convenient to use one or more mirrors. The laser source can be arranged outside the preform so that the beam is directed longitudinally down the inside of the preform (preferably parallel or near-parallel to the longitudinal axis, to an angled mirror positioned inside the preform which directs the beam in a more transverse direction towards the contact point.

Figure 12:
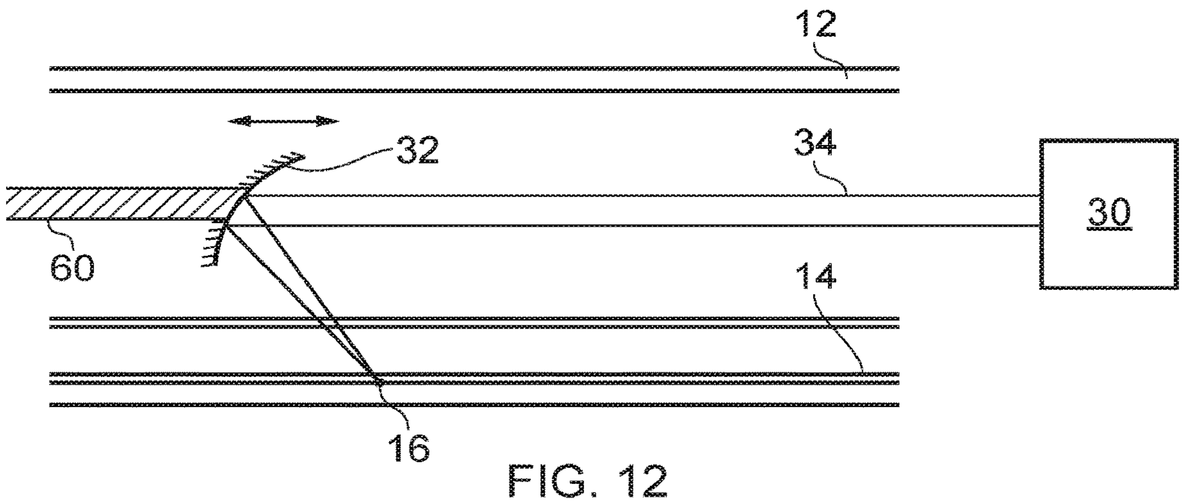
FIG. 12 shows a simplified schematic longitudinal view of an alternative apparatus for a fabrication method in accordance with embodiments.

FIG. 12 shows a schematic cross-sectional view of an example arrangement to achieve internal welding of this kind. A capillary 14 is positioned against the inner surface of an outer tube 12, as before. A weld is required at a contact point 16 between the tube 12 and the capillary 14. A laser source 30 is arranged so that its beam 34 can be directed longitudinally along the interior of the preform. This can be achieved with suitable beam directing and/or focusing optics (not shown) if desired. Focusing optics 32 (in this example a single concave mirror to produce both focusing and reflection of the beam to the required direction, but in other cases different optical elements may be used, such as a combination of lenses and mirrors) are positioned at an angle inside the preform to intercept the beam 34, and direct it outwardly towards the tube walls, in alignment with or in the vicinity of the contact point 16. As depicted, the beam 34 travels along the outer tube 12 and the mirror 32 is located inside the outer tube; in this arrangement the redirected beam is incident first on the outside of the capillary 14, and passes through the capillary wall and across the lumen of the capillary 14 to reach the inner surface of the capillary for absorption around the contact point 16. In this case, it may be preferred to use a focused laser beam with the focus at or near the contact point 16, and more importantly, remote from the opposite wall of the capillary 14 through which the beam 34 passes to reach the weld area, to reduce heating of this part of the capillary 14. In an alternative arrangement, the beam 34 might be directed from the source 30 along the inside of the capillary 14, to optics 32 positioned inside the capillary 14, which direct the beam 34 directly onto the inner surface of the capillary. This configuration avoids the need for the beam 34 to pass through the whole of the capillary 14 to reach the contact point 16, but may be less convenient owing to the smaller inner diameter of the capillary 14 compared to the inner diameter of the outer tube 12.

Further nested capillaries can be included, as before, with the laser beam travelling along the lumen of any capillary to reach the directing optics, subject to inner diameter constraints versus the requirement for the beam to pass through the capillaries to reach the contact point region. In any or all of these example, however, the beam is considered to be directed along the interior of the outer tube to reach the contact point, even if the beam is also inside a capillary, which will also be in the interior of the outer tube. This is in contrast to the earlier examples where the beam is directed externally to the outer tube to reach the contact point. In the former case, the beam is incident on an inner surface of a capillary anterior to the contact point with respect to the beam propagation direction (regardless of any capillary walls it has passed through to reach the inner surface), and in the latter case, the beam is incident on an outer surface of an outer tube anterior to the contact point with respect to the beam propagation direction.

In an arrangement such as the FIG. 12 example and its variants discussed above, the directing optics 32 can be mounted on a stage 60 or the like for translation along a direction parallel to the longitudinal axis of the outer tube 12. Movement of the optics 32 along this direction (shown by the arrow) by operation of the stage 60 will translate the incident point of the beam along the length of the preform to achieve a bond along the contact line between the capillary 14 and outer tube 12. As previously described, this may be a continuous weld or a tacked bond of spaced apart welds. A single pass or several passes of the beam may be used.

The preforms which can be fabricated using the methods disclosed herein are not limited to the examples shown thus far. Other configurations of various numbers of tubes can be made, as will be readily appreciated. Any contact between two tubes or capillaries can be bonded by an appropriately directed laser beam. Welds for differently positioned or common contact lines can be performed in sequence to build up a preform structure, or a common contact line for multiple tubes/capillaries can be welded to create a complete preform with one welding step.

Figure 13:
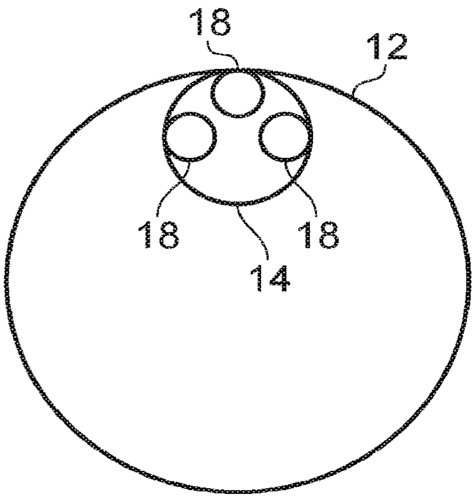
FIGS. 13 and 14 show schematic transverse cross-sections of example optical fibres that may be fabricated using embodiments of the disclosed method.

FIG. 13 shows a cross-sectional view of an example preform (or cane or finished fibre) with an alternative configuration. In this case an outer tube 12 has a primary capillary 14 bonded to its inner surface. In turn, the primary capillary 14 has three equally-sized secondary capillaries 18 bonded to its inner surface, where the secondary capillaries 16 are spaced apart around the circumference of the primary capillary 14 along different contact lines. The capillary unit comprising the primary capillary and the secondary capillaries could be made as a first fabrication step, followed by bonding of the unit to the outer tube. Further capillary units can be added within the outer tube 12, at different contact lines around the circumference of the outer tube 12.

Figure 14:
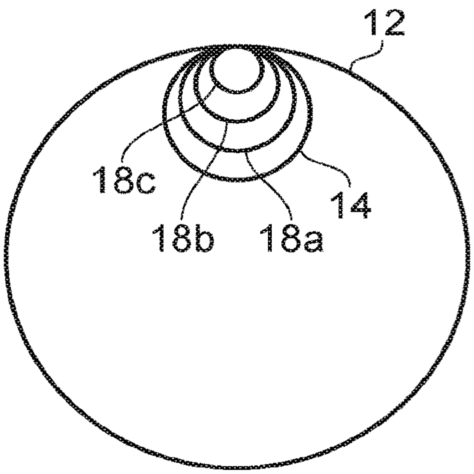

FIG. 14 shows a cross-sectional view of a further example preform. In this example, an outer tube 12 has a capillary unit bonded to its inner surface, and the capillary unit comprises a primary capillary 14 with three secondary capillaries 18*a*, 18*b*, 18*c* of decreasing diameter bonded inside it in a nested formation. The four capillaries and the outer tube 12 are all bonded along a common contact line. The capillary unit could be constructed by sequential welding stages to bond the smallest secondary capillary 18*c* inside the middle secondary capillary 18*b*, then the middle secondary capillary 18*b* inside the largest secondary capillary 18*a*, then the largest secondary capillary 18*a* inside the primary capillary 14 (or in another order), before the completed nested capillary unit is secured into the outer tube 12. Alternatively, the capillaries and outer tube might be bonded all together in a single welding step. Further same or different capillary units might be added at other contact lines around the inner surface of the outer tube 12.

While the particular examples discussed herein have referred to preforms made from silica, the technique is generally applicable to preforms made from any glass material. The various tubes or components (outer tube and inner capillaries, including primary, secondary or further capillaries) in a single preform may be made from the same glass or from different glasses. Herein, the term "glass" is intended to refer to any material having appropriate physical and optical properties such that an outer tube or a capillary for use in an optical fibre may be made from it, and which can be softened or melted by an incident laser beam sufficiently to allow bonding of the components into position within a preform. In general, a glass is a non-crystalline amorphous solid which exhibits a glass transition when heated towards the liquid state. Types of glass include "silicate glasses" or "silica-based glasses", based on the chemical compound silica (silicon dioxide, or quartz), of which there are many examples. Other glasses suitable for optical applications include, but are not limited to, chalcogenide, tellurite glasses, fluoride glasses, and doped silica glasses. Appropriate selection of the laser operating parameters (wavelength, power, energy, pulse duration and frequency, time between exposures, beam size, and the like) will be required with some of these materials, such as chalcogenide, to reduce or avoid issues such as glass fracture or glass crystallisation which may occur more readily than with silica. The glasses may include one or more dopants for the purpose of tailoring the optical properties, such as modifying absorption/transmission or enabling optical pumping.

The optical source (laser) for generating the laser beam can be selected by reference to the properties of the glass materials to be bonded, such that the wavelength has an appropriate absorption depth to produce the required temperature rise for bonding over a suitably sized region of the material around the contact point or contact line. The operating parameters can be similarly selected to deliver an appropriate amount of energy to produce the required softening/melting of the glass material, and possibly also to avoid ablation of the material. These may include average power, peak power, pulse duration and repetition rate for a pulsed laser, or the choice of continuous wave (cw) operation. As noted, the 10.6 μm wavelength output of a carbon dioxide laser is appropriate for silica glasses. Other lasers may include, but not limited to, a carbon dioxide laser (9 to 11 μm wavelength range) for use with silica, doped silica and fluoride glasses, a carbon monoxide laser (5 to 6 μm wavelength range) for use with silica, doped silica and fluoride glasses; a 532 nm wavelength laser (green output) preferably with pulsed operation for use with silica, doped silica, chalcogenide, tellurite or fluoride glasses, and an ultraviolet wavelength laser for use with silica, doped silica, chalcogenide, tellurite and fluoride glasses.

The laser beam may be directed onto the surface of the preform (outer surface of the outer tube or inner surface of a capillary) in a perpendicular geometry, so that it is aligned along the radius of the tube or capillary where the radius meets the contact point (radially aligned with the contact point). In other words, the beam direction is orthogonal to the tangent to the relevant tube or capillary at the contact point. However, this is not required, and other geometries can be used as preferred or convenient, which are effective at delivering the required energy to the vicinity of the contact point to achieve the required fusing of the glass surfaces at the contact point. A perpendicular geometry can minimise the thickness of glass between the incidence point on the surface and the contact point, which might be appropriate in some cases. In other case, a sloping or angled geometry, such as in FIG. 12, might be preferred to give an increased path length through the glass to increase energy absorption and therefore increase the delivered heat. In other cases, an angled, non-perpendicular incidence might be physically more convenient to implement. In any case, the path length through the glass should be taken into account when determining the amount of heat energy required to be delivered and the region into which it will be delivered. An angled beam arrangement also enables the concurrent use of more than one beam to create a weld.

Figure 15:
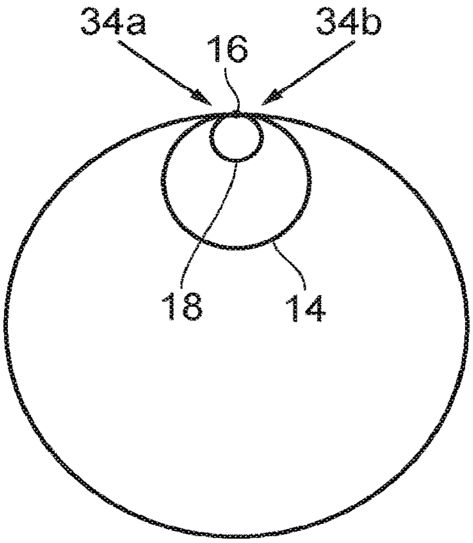
FIG. 15 shows a simplified schematic transverse view of a further example apparatus for implementing embodiments of the disclosed method.

FIG. 15 shows a cross-sectional view of an example fabrication method in which two laser beams 34*a*, 34*b* are directed towards a contact point 16 between an outer tube 12 and a nested pair of capillaries 14, 18 from the exterior of the preform. The beams are arranged at an angle either side of the perpendicular position, so they can deliver energy to the contact point region from both sides simultaneously. This can be useful to form the weld more quickly, or if the absorption depth of the laser beam in the glass is small and/or the thermal conductivity in the glass is low so that it is difficult to efficiently produce the required heating with a single beam. Two beams also allow increased energy delivery if two laser sources are used, where sufficient power cannot be obtained from a single laser source. The two laser sources need not be the same in terms of operating wavelength or temporal characteristics. Alternatively, the two beams can be derived from a single laser source via a beam splitter. Such arrangements are not limited to two beams, and more than two can be employed. For multiple laser use (two or more beams), the beams can be directed to a common incidence location on the preform, or adjacent locations, so that their effect is combined, as in FIG. 15, or may be directed to multiple different incidence locations to enable simultaneous welding of multiple contact lines or multiple spaced-apart points along the same contact line.

The foregoing discussion has assumed a linear interaction of the light with the glass, in which the laser light is absorbed so that its energy causes a temperature rise in the glass to produce softening or melting. However, the invention is not limited in this regard, and the nonlinear optical regime may be used instead. For this, the optical source for generating the laser beam or beams is a pulsed source selected by reference to the nonlinear properties of the glass material or materials to be bonded, such that the combination of pulse peak power, pulse duration and pulse repetition frequency provides sufficient nonlinear optical absorption to produce a temperature rise for bonding over a suitably sized region of the glass material around the contact point or contact line. Nonlinear optical absorption generally occurs through multiphoton absorption effects and requires high optical field intensities, which can be achieved using short or ultrashort optical pulses and a tightly focused laser beam. This focusing arrangement enables localised deposition of heat in an otherwise transparent material (that might have low absorption of the particular laser light in the linear regime).

Accordingly, to use nonlinear optical absorption for bonding, the focus of the laser beam should be positioned at or very near the intended bond location (so, at or around the contact point or contact line, at the interface between two tubes to be bonded) to localise the heat generation to where it is needed. The glass is thereby fused at the bond location, while heat generation elsewhere is minimised or prevented; this may be advantageous for avoiding possibly unwanted thermal effects in other portions of the glass materials.

Furthermore, it is possible that in the nonlinear absorption regime, bonding can be produced without or in addition to a thermal effect, and instead occurs via a photo-ionisation effect, possibly including ion transfer or ablation.

For bonding via nonlinear absorption effects (thermal and non-thermal) a laser operable to generate pulses of femtosecond, picosecond or nanosecond duration can be used, operating at peak pulse powers at or above 10 kW, or 100 kW, or 100 MW, or even higher. Moreover, the linear optical absorption of the operating wavelength of the laser in the glass material may be relatively low, for example 1 dB/m or less, 0.1 dB/m or less, 0.01 dB/m or less, 0.001 dB/m or less, or even lower. Thus, more flexibility in selecting the laser source may be offered compared to a linear absorption regime where the laser wavelength should be matched to the glass properties for effective absorption and adequate temperature increases.

Hence, the bonding of the glass can be achieved by thermal effects (heating) to soften or melt a portion of the glass, and/or by non-thermal effects including photo-ionisation and ablation, depending on the properties of the laser beam directed onto the preform for absorption by the glass, i.e. whether the laser properties induce linear or nonlinear optical absorption. For all options, energy is delivered by the laser beam to the glass of one or both of the two adjacent (contacting) tubes so that the glass of the two tubes is fused together at the contact point or along the contact line to provide the desired bond. While various physical effects can be induced in the glass by the laser energy (heating, melting, softening, ionisation, etc.), the desired result of uniting or merging the two adjacent glass surfaces can be produced; the glass of the two tubes can be coalesced to form the bond.

The various configurations described above for positioning the glass tubes and applying the laser beam or beams are relevant also to bonding using nonlinear optical absorption, provided that the focus of the laser beam is properly positioned in view of the highly localised effect produced by the nonlinear regime.

While some particular examples of sizes and wall thicknesses of outer tubes and capillary tubes have been mentioned above, the embodiments are not limited in this regard. Some typical examples of these parameters for tubes from which preforms may be made include (but are not limited to) fibre preforms of diameter up to 30 mm (so that the outer tube 12 has an outer diameter of 30 mm) with a wall thickness of up to 2 mm, and primary capillaries with an outer diameter of up to 10 mm with a wall thickness of up to 2 mm which are nested with secondary capillaries with an outer diameter up to 7 mm with a wall thickness up to 2 mm. Tubes and capillaries of other diameters and thickness may alternatively be used.

A preform for an antiresonant hollow core optical fibre can include any number of primary capillaries, with or without secondary capillaries nested inside the primary capillaries, and optionally with further capillaries nested inside the secondary capillaries. Structures are not limited to the examples depicted herein, and the methods disclosed herein are applicable to all and any configuration of preforms for antiresonant hollow core optical fibre, and to elements for inclusion in such a preform, such as a nested set of capillaries to be incorporated into an outer tube in a separate later stage. Also, the methods may be applicable to fabrication of preforms for other optical fibres which comprise hollow tubular elements.

Figure 11:
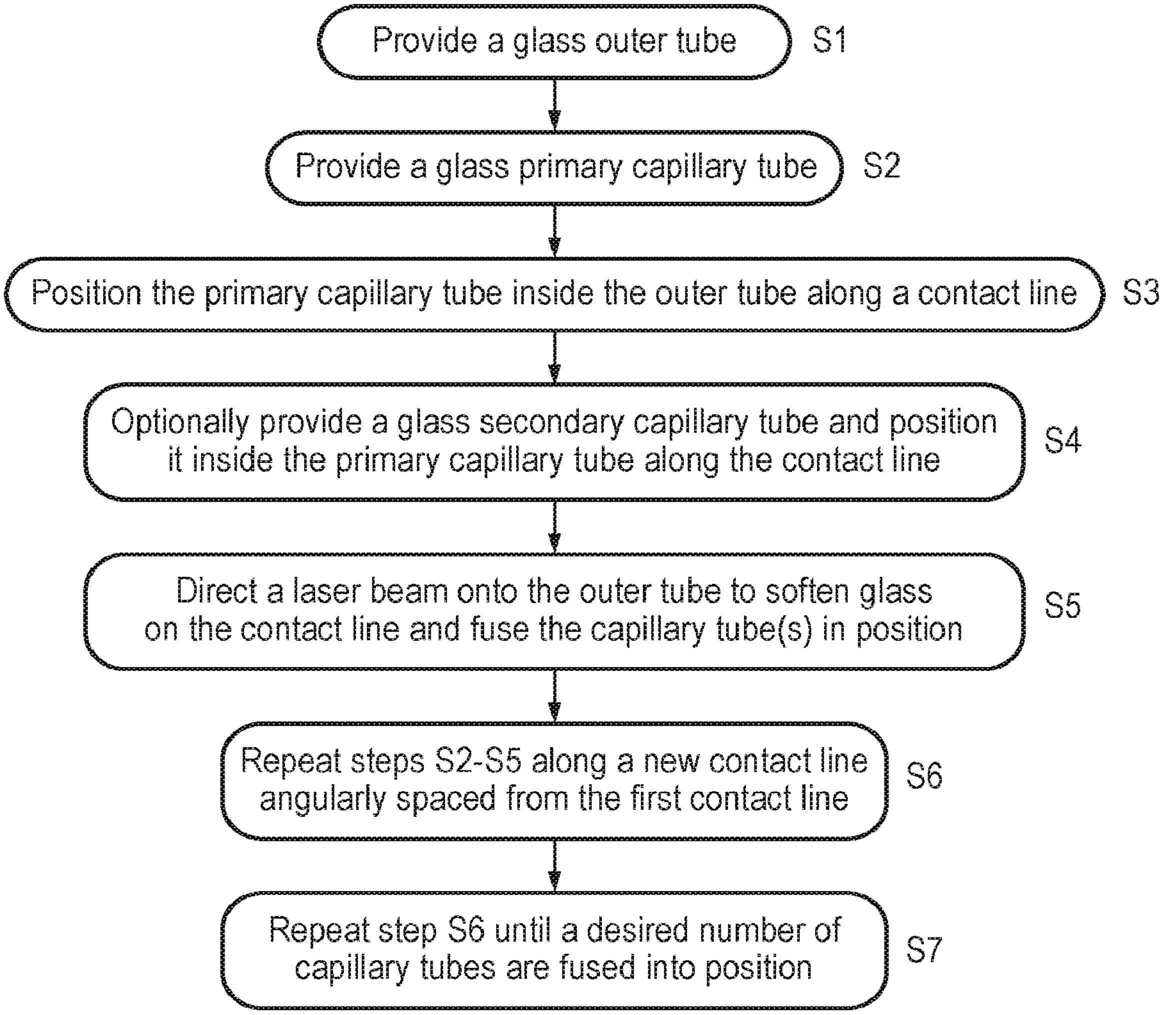
FIG. 11 shows a flow chart of steps in a preform fabrication method according to an embodiment.

FIG. 11 shows a flow chart of steps in an example method in accordance with the present disclosure. In a first step S1, one provides an outer tube for a preform, made from a glass material. In step S2, a primary capillary tube is provided, also of glass, and smaller in diameter than the outer tube. The primary capillary tube is positioned inside the outer tube, against the inner surface of the outer tube and along a contact line between the tubes which is parallel to the longitudinal axes of both tubes, in step S3. Then, optionally, in step S4 a secondary capillary tube may be added, also of glass and with a smaller diameter than the primary capillary tube, which is positioned inside the primary capillary against its inner surface and aligned with the contact line. Alternatively, the positioning actions may be reversed, by positioning the secondary capillary inside the primary capillary first, and then positioning the primary capillary inside the outer tube.

In step S5, a laser beam is directed onto the outer tube at one or more locations along the contact line, to deliver energy to heat the glass in the vicinity of the contact line so that it softens, and enables the tubes to bond together along the contact line once the glass has cooled and hardened. Steps S2 to S5 can then be repeated as step S6 to secure a further primary capillary tube (and optional secondary capillary tube) inside the outer tube, along a contact line spaced apart from the first contact line around the circumference of the outer tube. Finally, step S7 allows the repetition of step S6 until a desired number of capillary tubes are bonded inside the outer tube, spaced around the circumference according to the required design of the intended optical fibre. Thus, a preform is fabricated, which can be drawn to form a cane or an optical fibre.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/ or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

REFERENCES

[1] J. R. Hayes, S. Sandoghchi, T. D. Bradley, Z. Liu, R. Slavik, M. A. Gouveia, N. V. Wheeler, G. T. Jasion, Y. Chen, E. Numkam-Fokoua, M. N. Petrovich, D. J. Richardson and F. Poletti, "Antiresonant hollow core fiber with octave spanning bandwidth for short haul data communications," Optical Fiber Communication Conference Postdeadline Papers (Optical Society of America, 2016), p. Th5A.3.

[2] A. N. Kolyadin, A. F. Kosolapov, A. D. Pryamikov, A. S. Biriukov, V. G. Plotnichenko and E. M. Dianov, "Light transmission in negative curvature hollow core fiber in extremely high material loss region," Opt. Express 21(8), 9514-9519 (2013).

[3] W. Belardi and J. C. Knight, "Hollow antiresonant fibers with reduced attenuation," Opt. Lett. 39(7), 1853-1856 (2014).

[4] M. Michieletto, J. K. Lyngso, C. Jakobsen, J. Legsgaard, O. Bang and T. T. Alkeskjold, "Hollow-core fibers for high power pulse delivery," Opt. Express 24(7), 7103-7119 (2016).

[5] B. Debord, A. Amsanpally, M. Chafer, A. Baz, L. Vincetti, J-M. Blondy, F. Gerome and F. Benabid, "7.7 dB/km losses in inhibited coupling hollow-core photonic crystal fibers," CLEO 2016 (San Jose, USA), OSA Technical Digest (online) (Optical Society of America, 2016), paper JTh4C.

[6] S. R. Sandoghchi, M. N. Petrovich, D. R. Gray, Yong Chen, N. V. Wheeler, T. D. Bradley, N. H. L. Wong, G. Jasion, J. R. Hayes, E. Numkam Fokoua, M. Botelho Alonso, S. M. Abokhamis Mousavi, D. J. Richardson, F. Poletti, "Optical side scattering radiometry for high resolution, wide dynamic range longitudinal assessment of optical fibers," Opt. Express 23(21), 27960-27974 (2015).

[7] W. Belardi, "Design and properties of hollow antiresonant fibers for the visible and near infrared spectral range," J. Lightwave Technol. 33(21), 4497-4503 (2015).

[8] A. F. Kosolapov, G. K. Alagashev, A. N. Kolyadin, A. D. Pryamikov, A. S. Biryukov, I. A. Bufetov and E. M. Dianov, "Hollow-core revolver fibre with a double-capillary reflective cladding," Quantum Electron. 46(3), 267-270 (2016).

[9] A. D. McLachlan and F. P. Meyer, "Temperature dependence of the extinction coefficient of fused silica for $CO_2$ laser wavelengths," Appl. Opt. 26, 1728-1731 (1987).

The invention claimed is:

1. A method of making an optical fibre preform comprising:

providing a outer tube of glass;

providing a hollow primary capillary tube of glass with an outer diameter smaller than an inner diameter of the outer tube;

positioning the primary capillary tube inside the outer tube such that an outer surface of the primary capillary tube lies against an inner surface of the outer tube along a contact line parallel to the longitudinal axes of the primary capillary tube and the outer tube; and bonding the primary capillary tube into its position inside the outer tube by directing a laser beam to be incident onto an inner surface of the outer tube such that a focal point of the laser beam occurs at the contact line, wherein the laser beam is directed from a focusing optic positioned within the outer tube.

2. The method according to claim 1, in which the laser beam deposits heat energy to cause softening of the glass of at least the outer tube or the primary capillary tube to enable the bonding.

3. The method according to claim 2, in which the laser beam undergoes linear optical absorption in the glass.

4. The method according to claim 2, in which the laser beam undergoes nonlinear optical absorption in the glass.

5. The method according to claim 1, in which the laser beam undergoes nonlinear optical absorption in the glass to generate photo-ionisation to enable the bonding.

6. The method according to claim 1, further comprising:

providing a hollow secondary capillary tube of glass with an outer diameter smaller than an inner diameter of the primary capillary tube; and, before directing the laser beam, positioning the secondary capillary tube inside the primary capillary tube such that an outer surface of the secondary capillary tube lies against an inner surface of the primary capillary tube in radial alignment with the said contact line; wherein directing the laser beam to bond both the primary capillary tube and the secondary capillary tube into their positions.

7. The method according to claim 1, in which the positioning comprises inserting the primary capillary tube into the outer tube, and supporting the outer tube in a horizontal orientation so that the primary capillary tube orient themselves at a lowest point inside the outer tube under gravity.

8. The method according to claim 1, wherein the contact line is a first contact line, the hollow primary capillary tube is a first hollow primary capillary tube, and the method further comprises:

holding the outer tube with a rotational stage; and after the step of directing the laser beam, rotating the outer tube about its longitudinal axis to align a second contact line, between a second hollow primary capillary tube and the outer tube, with the laser beam before performing a further positioning and a further directing of the laser beam with respect to the second contact line.

9. The method according to claim 1, in which directing the laser beam at one or more locations aligned with the contact line comprises directing the laser beam continuously along the contact line.

10. The method according to claim 1, further comprising:

providing an additional outer tube of glass with an inner diameter larger than an outer diameter of the said outer tube;

positioning the said outer tube inside the additional outer tube such that an outer surface of the said outer tube lies against an inner surface of the additional outer tube along a further contact line being the said contact line; and directing the laser beam onto a surface of the additional outer tube or the said outer tube at one or more locations aligned with the further contact line so as to bond the outer tube into its position inside the additional outer tube.

11. A method of making an optical fibre preform comprising:

providing a outer tube of glass;

providing a hollow primary capillary tube of glass with an outer diameter smaller than an inner diameter of the outer tube;

positioning the hollow primary capillary tube inside the outer tube, such that an outer surface of the primary capillary tube lies against an inner surface of the outer tube along a contact line parallel to longitudinal axes of the primary capillary tube and the outer tube, wherein the hollow primary capillary tube orients itself at a lowest point inside the outer tube under gravity; and bonding the primary capillary tube into its position inside the outer tube by directing a laser beam to be incident onto an inner surface of the primary capillary tube at one or more locations aligned with the contact line, wherein the laser beam is directed from a focusing optic positioned within the outer tube.

12. The method according to claim 11, in which directing the laser beam comprises focusing the laser beam and positioning a focus to coincide with the contact line.

13. The method according to claim 11, comprising directing the laser beam in radial alignment with the contact line.

14. The method according to claim 11, comprising directing the laser beam angularly spaced from radial alignment with the contact line.

15. The method according to claim 11, further comprising directing a second laser beam at or adjacent to the one or more locations simultaneously with directing the said laser beam.

16. A method of making an optical fibre preform comprising:

providing a outer tube of glass;

providing a hollow primary capillary tube of glass with an outer diameter smaller than an inner diameter of the outer tube;

providing a hollow secondary capillary tube of glass with an outer diameter smaller than an inner diameter of the hollow primary capillary tube;

positioning the hollow primary capillary tube inside the outer tube such that an outer surface of the hollow primary capillary tube lies against an inner surface of the outer tube along a contact line parallel to longitudinal axes of the hollow primary capillary tube and the outer tube;

positioning the hollow secondary capillary tube inside the hollow primary capillary tube such that an outer surface of the hollow secondary capillary tube lies against an inner surface of the hollow primary capillary tube in radial alignment with the said contact line; and bonding the hollow primary capillary tube and the hollow secondary capillary tubes into their positions inside the outer tube by directing a laser beam to be incident onto the inner surface of the hollow secondary capillary tube at one or more locations aligned with the contact line, wherein the laser beam is directed from a focusing optic positioned within the outer tube.

17. The method according to claim 16, wherein the laser beam is incident onto the inner surface of the hollow secondary capillary tube.

18. The method according to claim 16, in which the laser beam undergoes nonlinear optical absorption in the glass to generate photo-ionisation to enable the bonding.

* * * * *